UNITED STATES PATENT OFFICE.

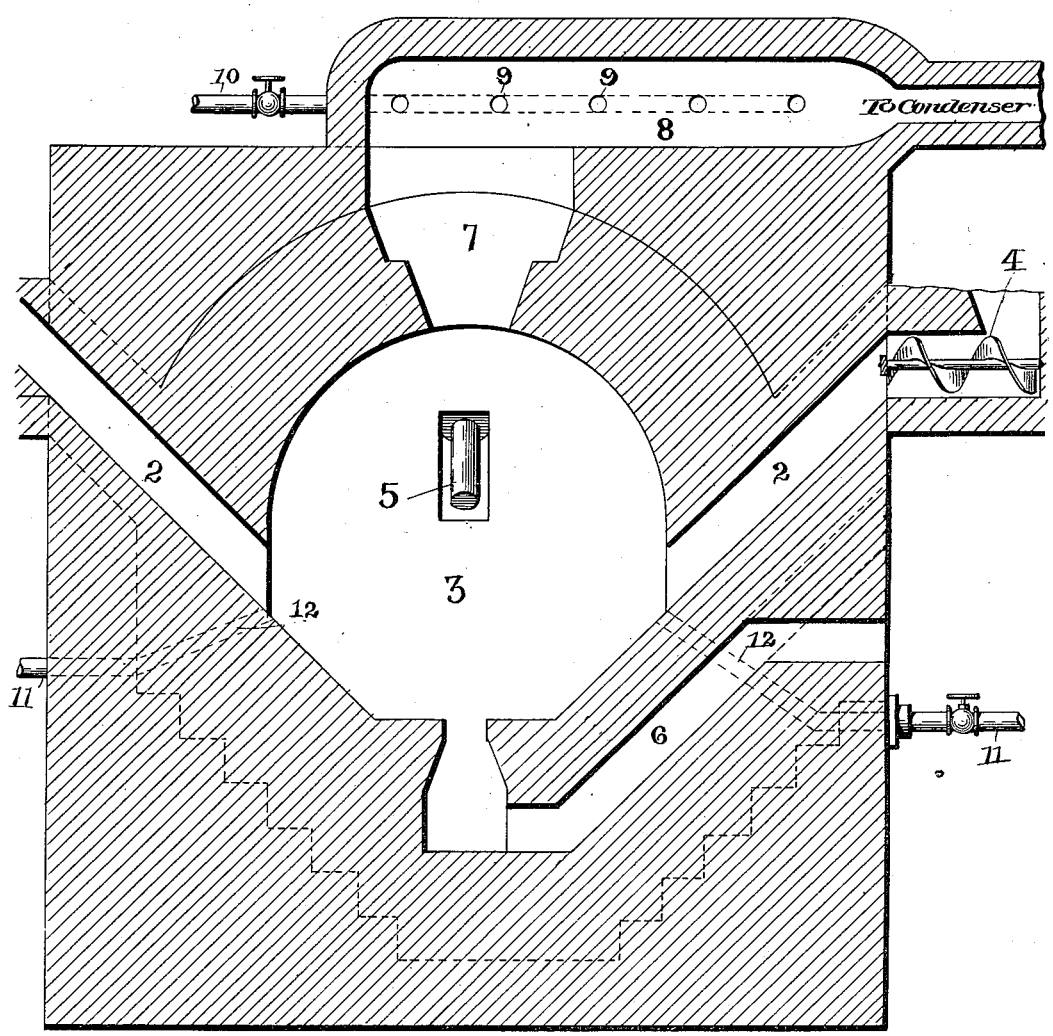

FRANK P. VAN DENBERGH, OF BUFFALO, NEW YORK.

ART OR PROCESS OF MAKING PHOSPHORIC ACID.

SPECIFICATION forming part of Letters Patent No. 669,271, dated March 5, 1901.

Application filed April 20, 1896. Serial No. 588,370. (No specimens.)

*To all whom it may concern:*

Be it known that I, FRANK P. VAN DENBERGH, a citizen of the United States, residing at Buffalo, New York, have invented certain new and useful Improvements in the Art or Process of Making Phosphoric Acid; and I do hereby declare the following to be a full, clear, and exact description of the invention, such as will enable those skilled in the art to which it appertains to employ the same.

More particularly, my invention relates to a new and improved art or process for the manufacture of phosphoric acid from apatite or other variety of phosph te or from other materials containing phosphorus by means of heat and electrolysis, both produced by an electric current, either continuous or intermittent.

In order to the better distinguish my process from that heretofore usually employed, I will now refer to the common manner of manufacturing phosphoric acid. In such manufacture it is customary to digest the ashes of bones with crude sulfuric acid for several days, separate the calcium sulfate formed by pressure filtration, concentrate the liquid acid by evaporation to a syrup, treat it with concentrated sulfuric acid, evaporate, and finally ignite it to remove the sulfuric acid. The ashes of bones are sometimes replaced by the mineral phosphates, and hydrochloric acid is sometimes used instead of sulfuric acid; but by any of these or similar methods the action is slow, imperfect, and expensive. Moreover, the product made by any of these processes contains sulfuric acid, magnesia, arsenic, or other impurities, and as phosphoric acid is largely used in pharmacy and medicine additional time and expense are necessary in order to remove these impurities. Chemically-pure phosphoric acid is prepared from elementary phosphorus by a slow oxidation in moist air or in shallow vessels containing a small amount of water. This, however, is tedious, expensive, and dangerous to the operatives.

My invention has for its object to utilize an abundant raw material having at present but little value in the industrial arts, to avoid the danger and to lessen the time and cost of producing phosphoric acid, and at the same time to render unnecessary the purification of the acid for many purposes where now such purification is absolutely essential.

In carrying out my invention instead of reacting upon bone-ashes or other phosphatic material with sulfuric or hydrochloric acid, and thus by slow and expensive process obtaining an impure phosphoric acid, I employ heat and electrolysis, both derived from an electric current within a furnace, and operate with these forces directly upon and through the apatite or other phosphorus-containing material. In practice I prefer that such phosphorus-containing material should be mixed with sand, gravel, quartz, cullet, clay, feldspar, shale, or other silicious material, which will serve as a flux, in order that there may be a molten mass or bath within the furnace of relatively easily-fused materials, and that the current of electricity should pass through this bath and the electrolysis should take place therein.

The atmosphere within the furnace should contain an excess of free oxygen, which may be supplied from hematite iron ore or other oxygen-yielding solid, which may be introduced into the furnace with the other solid materials, or from steam, air, oxygen, ozone, or other oxygen-yielding gas which may be injected into the furnace.

In carrying out my invention the apatite or other phosphorus-containing material and the other solid materials which may be employed are first crushed or broken into small pieces in order to facilitate feeding them into the furnace and their subsequent fusion therein. The silicious materials are first fused by the heat of the electric current and form a molten bath, and the electric current passing into and through this bath operates by electrolysis to decompose the phosphorus-containing material, liberating phosphorus, and this being set free in an atmosphere containing an excess of free oxygen there are formed phosphorus oxids, principally the pentoxid, ($P_2O_5$,) which oxids are afterward hydrated, thereby forming phosphoric acid. This acid is led off, condensed, cooled, and collected by means of suitable apparatus.

To insure the hydration of the phosphorus oxids, I prefer to introduce steam or vapor of water into the furnace-chamber.

The electric furnace employed may be of any desired type, provided it has a properly-closed chamber and a proper exit for the vapors which are formed within the furnace-chamber, such exit connecting with a condensing apparatus. It is especially advantageous, however, to use a furnace affording a continuous process of reduction. In the drawing accompanying this case I have illustrated in central transverse section an electric furnace adapted to the carrying out of my invention, all details of construction and arrangement being omitted in so far as permissible with a showing of an apparatus sufficient for a clear understanding of my process. Referring to such drawing, 2 2 represent feed-passages through which the material to be operated upon is introduced into the body of the furnace 3. In connection with one of the passages 2 is a conventional representation of an automatic and continuous feeding device, a worm or screw feed being represented at 4.

5 represents one of the electrodes, of which any suitable number may be employed and which may be mounted in any desired manner.

The fused slag passes off through the discharge-conduit 6, and the vapors or gases generated within the furnace-chamber are discharged through an opening 7 into a trunk or conduit 8, which is connected with a condensing apparatus, the latter not being shown.

9 9 are openings into the trunk or conduit 8, through which steam may be introduced into the latter, the steam being supplied from a pipe 10. It is in this trunk, chamber, or conduit 8 that the main portion of the hydration of the oxid vapors from the furnace takes place, the steam or water vapor supplied through the apertures 9 supplying the elements for such hydration.

11 11 indicate steam-pipes connected with openings or passages 12, leading into the body of the furnace. Through these vapor or water may be discharged directly into the furnace-chamber when conditions require that this should be done.

The material is introduced into the furnace and being brought within the direct influence of the electric current it is rapidly fused. The exact amount or proportion of the flux which may be used cannot be stated arbitrarily, owing to the variation in the character and richness of the phosphorus-containing material and must in each case be relatively determined, as it may be by any person skilled in the art of smelting ores. The quantity of steam must in like manner be determined by the quality of the solid materials and the volume of such materials being used in the process. The volume and quality of the electric current employed will also be determined by the work done and by the character of the material being treated.

The method and means which I employ for condensing the vapors are not essentially different from those commonly employed, and I may use any successful system. I prefer, however, to conduct the vapors through tubes of acid-resisting material, which are submerged in rapidly-flowing cold water before discharging them into a condensing-chamber for the economy afforded thereby. I do not, however, restrict or limit my invention to the particular means described for carrying out the process, as any one and all of them may be varied without departing from the spirit of my invention, and I do not limit myself to the use of steam or water vapor as an oxidizing agent, but claim the right to use oxygen or air, ozone, hematite iron ore, or other suitable material capable of yielding a large proportion of oxygen when subjected to the heat and energy of the electric current within the furnace, and these oxygen-yielding materials may be heated separately from the phosphorus-yielding materials, as is sometimes desirable, in order that a part of the phosphorus may not be lost by its combination with the other materials—such, for instance, as iron, when hematite iron ore is used as the oxygen-supplying material.

Having thus described my invention, what I claim, and desire to secure by Letters Patent, is—

1. In the manufacture of phosphoric acid, the herein-described process, which consists in subjecting a phosphorus-containing substance and a silicious substance to heat and electrolysis until a silicate is formed, and substantially all of the phosphorus has been driven off or set free, and combining the phosphorus with oxygen and hydrogen to form phosphoric acid, substantially as set forth.

2. In the manufacture of phosphoric acid, the herein-described process, which consists in subjecting a phosphorus-containing substance and a silicious substance to heat, and electrolysis derived from an electric current, in an atmosphere containing an excess of oxygen, until a silicate is formed, and substantially all of the phosphorus has been driven off or set free, whereby phosphorus oxids are formed, and subsequently hydrating these oxids to form phosphoric acid, substantially as set forth.

3. In the manufacture of phosphoric acid, the herein-described process, which consists in subjecting a native phosphate to heat and electrolysis, both derived from an electric current applied to the phosphate until substantially all of the phosphorus has been driven off or set free, and combining the phosphorus with hydrogen and oxygen to form phosphoric acid, substantially as set forth.

4. In the manufacture of phosphoric acid, the herein-described process, which consists in subjecting a phosphorus-containing substance and a silicious substance to heat and electrolysis, both derived from an electric current applied within a furnace, and directly to the material while in a molten condition, and in the presence of an excess of oxygen until a silicate is formed, and substantially all of the phosphorus has been driven off or set free, and combining such phosphorus with oxygen and hydrogen to form phosphoric acid, substantially as set forth.

5. In the manufacture of phosphoric acid, the herein-described process, which consists in subjecting a phosphorus-containing substance and a silicious substance to heat and electrolysis derived from an elecric current, and applied to the substance being treated until substantially all of the phosphorus has been driven off or set free, oxidizing the phosphorus, and injecting steam into the phosphorous oxids which have been formed to produce phosphoric acid, substantially as set forth.

In testimony that I claim the invention above set forth I affix my signature in presence of two witnesses.

FRANK P. VAN DENBERGH.

Witnesses:
THOMAS D. MACNOE,
FRANK T. HAGGERTY.